No. 794,350. PATENTED JULY 11, 1905.
S. FEUST.
AIR BRAKE CONNECTION JOINT.
APPLICATION FILED FEB. 27, 1904.
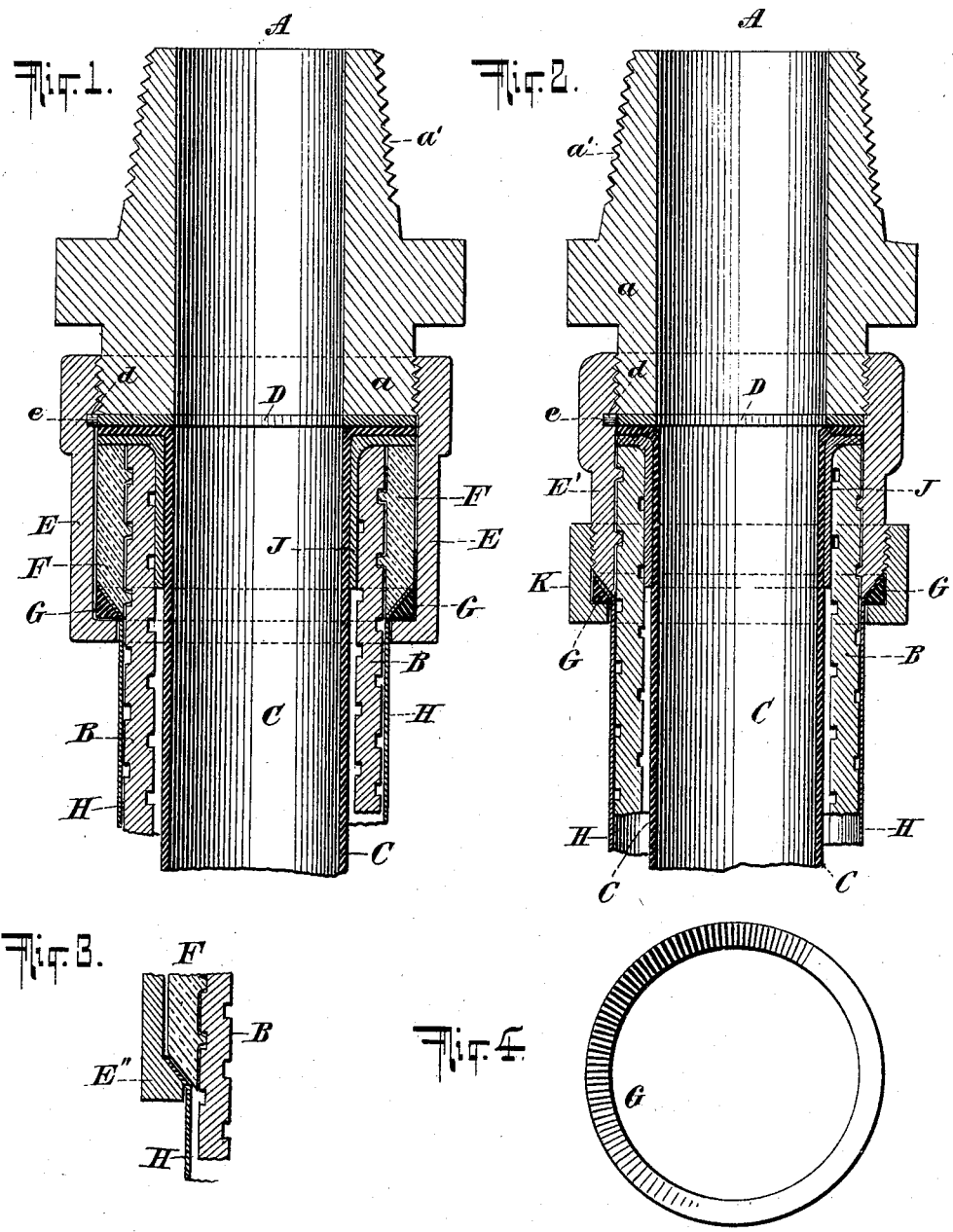
WITNESSES:
Gustave Dieterich.
Edwin H. Dieterich.
INVENTOR
Sigmund Feust
BY
J. Alexander Koones
ATTORNEY No. 794,350. Patented July 11, 1905.

UNITED STATES PATENT OFFICE.

SIGMUND FEUST, OF NEW YORK, N. Y.

AIR-BRAKE-CONNECTION JOINT.

SPECIFICATION forming part of Letters Patent No. 794,350, dated July 11, 1905.

Application filed February 27, 1904. Serial No. 195,615.

*To all whom it may concern:*

Be it known that I, SIGMUND FEUST, a citizen of the United States, and a resident of the borough of the Bronx, in the city of New York, county of New York, and State of New York, have invented new and useful Improvements in Air-Brake-Connection Joints, of which the following is a full, clear, and exact description.

My invention relates to railway-air-brake connections composed of flexible tubing made of spirally-wound metal strips, lined with rubber hose, covered with a textile fabric, and attached at each end to a metal coupling; and my invention relates more particularly to the means of uniting such tubing and couplings and securing the ends of the outside covering.

The metal tubing hereinafter particularly referred to is tubing described in United States Letters Patent No. 330,910, dated November 24, 1885, and issued to E. Levavaseur, though my invention may be employed with any tubing of similar construction.

The object of my invention is to devise a joint for such hose and couplings which will be air-tight and which can be used also for clamping the end portion of the textile covering. In Letters Patent of the United States numbered 735,735, dated August 11, 1903, and issued to Berton L. Wright and myself, a joint for such connections is described wherein the ribs of the metal hose are used as screw-threads and the ends of the hose are screwed into the nipples of the couplings, thereby making lap-joints between them. In an application made by me for Letters Patent of the United States and filed in the Patent Office in Washington on December 9, 1903, another joint for such connection is described and claimed. This latter joint is made with a bushing located upon the end section of the hose, which is set in the nipple of the coupling and fastened in place by a flanged nut which screws upon the nipple of the coupling and the flange of which bearing upon one end of the bushing compresses the other end of the same against an annular seat within the coupling whereby a lap-joint is made between the hose and coupling without rotating the hose.

In the invention hereinafter described a flush joint is effected between the end of the hose and the end of the nipple of the coupling without rotating the hose.

In the drawings, Figure 1 is a central longitudinal section of my improved joint. Fig. 2 is a central longitudinal section of a varied construction of the same; Fig. 3, a detailed view of a varied construction of the clamping parts, and Fig. 4 a perspective view of the clamping-ring.

In the different figures of the drawings similar letters indicate similar parts.

A is the metal coupling, with a straight nipple $a$ and the usual cone-shaped nipple $a'$.

B is the flexible metal tubing.

C is a rubber-lining tube with a flanged end.

D is a metal washer, upon the periphery of which is a point $d$.

E is a fastening and compressing sleeve provided interiorly with the slot $e$.

F is a metal bushing having one end beveled.

G is a dished ring or collar having a face beveled inwardly toward the axis.

H is the outside covering of rubber cloth or some textile material.

E′ in Fig. 2 is a modified form of the fastening-sleeve E, and E″ in Fig. 3 is another modified form of the fastening-sleeve E. (Shown in Fig. 1.)

J is a metal ferrule, and K is a flanged nut forming part of the clamping mechanism. (Shown in Fig. 2.)

To make one of my improved joints, I draw one end of the cloth covering H through the bore of the turned-in flange of the sleeve E and through the ring G and insert in such covering the metal tubing B, so that the end of such tubing projects beyond the ring and sleeve and also beyond the extremity of the cloth covering. I then place the bushing, which is either cast or cut, upon the end of the metal tubing and seat the ferrule J upon the ends of the metal tubing and the bushing. Into the metal tubing B, I then place the rubber lining C and let its flange rest upon the flange of the ferrule J. The end section of the cloth covering H is then located upon the surface of the bevel end of the bushing and secured in place by the bevel-face of the ring G. The sleeve E is then slid up on the tube until its flange presses the ring G against the end section of the cloth covering and the beveled end of the bushing. The point d of the washer D is then inserted into the slot e within the bore of the sleeve E, and the washer is pressed down into the unoccupied portion of the bore of such sleeve until it rests upon the flange of the rubber tubing. The nipple a of the coupling A, which is exteriorly provided with screw-threads, is then screwed into the unoccupied bore of the fastening-sleeve until its annular end face rests upon the washer D, and the joint is securely fastened. The rotation of the washer D is prevented by its point d, and the turning of the coupling within the bore of the sleeve E has thereby no rotating effect upon the rubber lining, the metal tubing, or its covering. They are consequently not distorted, twisted, or put out of condition.

If preferred, that portion of the fastening-sleeve which covers the bushing F may be interiorly grooved with spiral grooves to fit upon the ribs of the metal tubing and then the turned-in flange of such sleeve and the bushing F may be omitted and that portion of the fastening-sleeve which surrounds the metal tubing may be then used for the double purpose of compressing the flange of the rubber-lining tube against the washer D and assisting in retaining the metal tubing in position in the coupling. This construction, which is shown in Fig. 2, where the fastening-sleeve is indicated by E', embodies the substantial features of my invention, as shown in Fig. 1, and enables the nipple a of the coupling A to be turned into the unoccupied portion of the bore of the binding-sleeve and its annular end seated upon the washer D without any rotation of or torsional strain upon the metal tubing or the rubber lining, as in the construction first described. With this construction the end of the fastening-sleeve E' may be beveled and the beveled face of the ring G may be forced against the end of the cloth covering H and the beveled end of the sleeve E' by a flanged nut K, as shown in Fig. 2, and the end section of the cloth covering may be thereby secured in position.

In place of the clamping ring or collar G the turned-in flange of the fastening-sleeve may be beveled upon its compressing-face, as shown in Fig. 3, where the fastening-sleeve is indicated by E'', and such beveled face may be use in coöperation with the beveled end of the bushing for the purpose of clamping the end section of the cloth covering, or the end of the bushing F instead of being beveled may be made an annular face vertical to the axis of the bushing, so that the upper face of the turned-in flange of the binding-sleeve E may operate against it. The ferrule J may be omitted and the end of the metal tubing should in that case be broken on its inside edge or rounded, so as not to cut the flange of the rubber lining.

The metal tubing, in combination with an outside covering, is described in the Letters Patent of the United States, No. 701,272, dated May 27, 1902, and issued to William Neil. The combination of the metal tubing, the ferrule J, and the flanged rubber hose above referred to is described and claimed in the aforesaid Letters Patent issued to Berton L. Wright and myself, and in this as in that invention the lining of the metal tubing may be made of any suitable material other than rubber.

It will be readily understood that the coupling A may be a pipe-coupling of the kind shown in the drawings or may be a coupling-head of ordinary construction or any other form of coupling which is furnished with a nipple a and that my joint may be used upon air-brake, signal, or steam-pipe connections.

I do not broadly claim the combination of the metal tubing with a bushing and a binding-thimble; but What I do claim as new is—

1. A joint for cloth-covered spirally-wound metal tubing consisting of the combination of the nipple a, the spirally-wound metal tubing B, the flanged rubber tubing C, the cloth covering H, the bushing F, the dished ring G, the washer D constructed integrally with the point d upon its periphery, and the fastening and compressing sleeve E interiorly furnished with a slot e to receive the point d of the washer D and furnished also with female screw-threads to engage with the male screw-threads upon the nipple a.

2. A joint for spirally-wound metal tubing consisting of the combination of the nipple a, the spirally-wound metal tubing B, the flanged rubber tubing C, the bushing F, the washer D constructed integrally with the point d upon its periphery, and the fastening and compressing sleeve E interiorly furnished with a slot e to receive the point d of the washer D and also furnished with female screw-threads to engage with the male screw-threads upon the nipple a.

3. In a joint for spirally-wound metal tubing the combination of the annular washer D having a point d integrally formed upon its periphery, with a fastening and compressing sleeve having an interiorly-located slot e to receive the point d.

4. In a joint for cloth-covered spirally-wound metal tubing the combination consisting of the fastening and compressing sleeve E having at one end a turned-in flange and being at the other end interiorly screw-threaded with threads designed to engage with screw-threads exteriorly located upon the nipple a, the dished ring G and the bushing F which has one end beveled to coöperate with the beveled face of the dished ring G.

5. A joint for spirally-wound metal tubing consisting of the combination of the nipple $a$, the spirally-wound metal tubing B, the flanged rubber lining C, the annular washer D having integrally constructed upon its periphery a point $d$ and means for fastening and compressing the end of the rubber-lined metal tubing B against the annular face of the said nipple $a$ without rotating the tubing, washer or rubber lining.

SIGMUND FEUST.

Witnesses:
J. ALEXANDER KOONES,
ALBERT MILLER.